United States Patent [19]

D'Silva

[11] 4,169,744

[45] Oct. 2, 1979

[54] NICKEL-CHROMIUM-SILICON ALLOY BRAZING FOIL

[75] Inventor: Thomas L. D'Silva, Belmont, Calif.

[73] Assignee: Western Gold and Platinum Company, Belmont, Calif.

[21] Appl. No.: 920,095

[22] Filed: Jun. 28, 1978

[51] Int. Cl.² ............................................... C22C 19/05
[52] U.S. Cl. .................................... 148/32; 75/134 F; 75/171; 75/172 R
[58] Field of Search .................... 75/171, 170, 134 F, 75/172 R; 148/32, 32.5

[56] References Cited

U.S. PATENT DOCUMENTS 3,856,513   12/1974   Chen et al. .............................. 75/171

*Primary Examiner*—R. Dean
*Attorney, Agent, or Firm*—Donald R. Castle

[57] ABSTRACT

Nickel-Chromium-Silicon alloys of the nominal composition, $Ni_{(45-78)} Cr_{(16-34)} Si_{(6-21)}$ in the form of thin foil are made ductile by the presence of appreciable amounts of an amorphous phase and a metastable, solid solution, microcrystalline single phase and are especially suitable for preplacement as preforms in a joining operation such as brazing. Up to abour 40 atomic percent of the nickel is replaceable with palladium.

5 Claims, No Drawings

NICKEL-CHROMIUM-SILICON ALLOY BRAZING FOIL

BACKGROUND OF THE INVENTION

1. Field of the Invention

This invention relates to nickel-chromium-silicon alloys. More particularly it relates to thin ductile Ni-Cr-Si metal foils having a density of about 100 percent.

2. Prior Art

The nickel-chromium-silicon alloys in the nickel-rich corner of the Ni-Cr-Si ternary triangle such as the composition specified in Aeronautical Material Specification 4782, ($Ni_{62.3} Cr_{18.9} Si_{18.8}$) have been used in the form of powders, pastes and less than 100 percent dense foil fabricated from powder, because of the brittle nature of these alloys when these alloys have a silicon content greater than 6 atomic percent.

The disadvantages of using powder and pastes is that the alloy when molten, has to flow into the joint and fill up the gap between the mating parts. The flow of the molten alloy is strongly sensitive to the brazing environment and under non-ideal conditions the alloy may not flow through the joint gap. Also the organic binders in the pastes leave a residual contamination which alter the properties of the brazed joint. The use of sintered foil which has a density of less than 100 percent will result in voids in the brazed joint.

U.S. Pat. No. 3,856,513 discloses a wire product where alloys are represented by the formula $T_iX_j$ wherein T is a transition metal and X is Al, Sb, Be, B, Ge, C, In, P, Si or Sn. The transition metals include metals from Groups IB, IIIB, IVB, VB, VIB, VIIB and VIIIB of the periodic table. The patent also teaches that the alloys contain at least 50 percent amorphous phase. As is apparent from that description, about 280 binary alloys are disclosed and an infinite number of alloys when mixtures of metals are used for T and X. The only alloys specifically disclosed are $Pd_{77.5} Cu_6 Si_{16.5}$ and $Ni_{40} Pd_{40} P_{20}$. The patent also discloses ternary alloys of the formula $M_aY_bZ_c$ in sheet, ribbon and powder form wherein M is Ni, Fe, Cr, Co or V, Y is P, C or B and Z is Al, Si, Sn, Sb, Ge, In or Be.

It is believed that a 100 percent dense foil of the Ni-Cr-Si alloys which are ductile in nature and is therefore suited for fabricating into brazing preforms of a required geometry, by conventional stamping or photo etching techniques, without cracking would be an advancement in the art.

The advantages of the present invention over the present techniques is the ability to make ductile foil which would be normally brittle if made by conventional techniques. The process of making ductile foil also results in foil of uniform composition which is highly desirable for obtaining brazed joints with a high degree of reproducibility. Such a ductile foil is especially suitable for fabricating into brazing preforms of required geometry.

SUMMARY OF THE INVENTION

In one aspect of this invention there is provided an alloy in the form of a brazing foil having a thickness of from about 0.0005 to about 0.005 inches and consisting essentially of from about 45 to about 78 atomic percent of nickel, from about 16 to about 34 atomic percent of chromium and from about 6 to about 21 atomic percent of silicon. Optionally up to about 40 atomic percent of the nickel can be replaced with palladium.

DETAILED DESCRIPTION OF PREFERRED EMBODIMENTS

For a better understanding of the present invention, together with the other and further objects, advantages and capabilities thereof, reference is made to the following disclosure and appended claims in connection with the above description of some of the aspects of the invention.

U.S. Pat. No. 3,856,513 claims that additions of silicon aid in the formation of the amorphous phase. However, the sole purpose of additions of silicon to the alloy of this invention is for its effect of depressing the melting range, as commonly used in nickel-base brazing alloys. Up to 40 atomic percent of the nickel is replaceable with palladium to depress the melting range further than that provided by silicon.

In the nickel-chromium-silicon system, alloys of a silicon content greater than about 6 atomic percent form nickel and chromium silicides which embrittle the alloy and do not allow for fabricating into thin foil by conventional casting and rolling techniques. The formation of silicides is well documented in the description of the Ni-Cr-Si ternary system as described by Knotek, Lugscheider and Eschnauer in Hartlegierungen Zum Verschleiss—Schutz, P. 30, Verlag Stahleisen MBH, Dusseldorf, 1975.

It is known that rapid cooling of a molten metal will in some instances form amorphous materials instead of crystalline phases. Some techniques for rapid quenching are disclosed in U.S. Pat. Nos. 3,896,203; 3,863,700; 3,881,540 and 3,881,541. In the practice of this invention it is preferred to use a metal stream from an orifice to impinge upon a rotating drum having its external surfaces cooled by an internal cooling medium such as water. The metal stream upon solidifying forms a sheet-like material that is projected from the drum by centrifugal force.

Depending on the cooling rate during the rapid quenching, the resulting structure consists of a combination of an amorphous phase, new phases not obtainable under equilibrium conditions and a solid solution with solubility limits extended beyond their equilibrium values as described by Pol Duwez, R. H. Willens in Transactions of the Metallurgical Society of AIME, Volume 227 p. 362, April 1963. The amorphous phase is intrinsically ductile because the glassy structure allows for slip in all possible directions. Additional ductility results from the presence of a microcrystalline single phase metastable solid solution which has a large grain-boundary area.

A rapid cooling rate of about $10^5$ °C./sec to $10^6$ °C./sec would prevent the formation of these embrittling silicides and extend the solubility of silicon in the Nickel-Chromium binary system. At the same time such high rates of cooling would create an appreciable amount of amorphous phase which has a disordered glassy structure. Above about 10 percent amorphous phase is preferred.

The alloy of this invention can be fabricated into thin foil containing appreciable amounts of amorphous phase and a metastable, micro-crystalline, solid solution, single phase, by the available rapid quenching techniques such as, melt extraction, melt-spin, vapor deposition or sputtering with cooling rates of about $10^5$ °C./sec to $10^6$ °C./sec.

An alloy fabricated in such manner is ductile and allows for fabrication of performs of intricate geometry, for preplacement in a brazing operation. The ductile foils of this invention have a thickness of from about 0.0005 to about 0.005 inches with thicknesses of from about 0.0015 inches to about 0.004 inches being preferred.

While alloys having the composition, $Ni_{(45-78)} Cr_{(16-34)} Si_{(6-21)}$ can be prepared in accordance with this invention in the form of a ductile brazing foil, preferred materials are $Ni_{(60-65)} Cr_{(17-20)} Si_{(18-20)}$ with AMS 4782 alloy having the composition, $Ni_{62.3} Cr_{18.9} Si_{18.8}$ being especially preferred. If desired up to about 40 atomic percent of the nickel present in the alloys can be replaced with palladium.

While there has been shown and described what are at present considered the preferred embodiments of the invention, it will be obvious to those skilled in the art that various changes and modifications may be made therein without departing from the scope of the invention as defined by the appended claims.

What is claimed is:

1. A thin ductile brazing sheet consisting essentially of an alloy consisting essentially of from about 45 to about 78 atomic percent of nickel, from about 16 to about 34 atomic percent of chromium and from about 6 to about 21 atomic percent of silicon, said sheet having a thickness of from about 0.0005 to about 0.005 inches and said composition containing a sufficient amount of an amorphous phase and a metastable, solid solution, microcrystalline phase to render said alloy ductile.

2. A sheet according to claim 1 wherein said amorphous phase is present in at least about 10 percent.

3. A sheet according to claim 1 wherein up to 40 atomic percent of the nickel is replaced by palladium.

4. A sheet according to claim 1 wherein said composition consists essentially of from about 17 to about 20 atomic percent of chromium and from about 18 to about 20 atomic percent of silicon.

5. A brazing sheet according to claim 4 wherein said composition has the formula, $Ni_{62.3} Cr_{18.9} Si_{18.8}$.